United States Patent
Ravilisetty

(10) Patent No.: US 7,410,599 B2
(45) Date of Patent: Aug. 12, 2008

(54) STABLE GREEN PHOSPHOR AND PLASMA DISPLAY PANEL USING THE SAME

(75) Inventor: Padmanabha Rao Ravilisetty, Highland, NY (US)

(73) Assignee: Matsushita Electric Industrial Co., Ltd, Osaka (JP)

( * ) Notice: Subject to any disclaimer, the term of this patent is extended or adjusted under 35 U.S.C. 154(b) by 150 days.

(21) Appl. No.: 11/069,744

(22) Filed: Mar. 1, 2005

(65) Prior Publication Data

US 2006/0197447 A1    Sep. 7, 2006

(51) Int. Cl.
*H01J 17/49*    (2006.01)
*C09K 11/80*    (2006.01)

(52) U.S. Cl. .......................... 252/301.4 R; 252/301.6 F; 252/301.4 P; 313/582; 313/584

(58) Field of Classification Search .......... 252/301.4 R; 313/582, 584
See application file for complete search history.

(56) References Cited

U.S. PATENT DOCUMENTS 7,025,902 B2 *  4/2006  Ravilisetty ............ 252/301.4 R

FOREIGN PATENT DOCUMENTS

| EP | 0 697 453 | 2/1996 |
| EP | 0 908 502 | 4/1999 |
| EP | 1 359 205 | 5/2003 |
| JP | 49-123992 | * 11/1974 |
| WO | WO 98/37165 | 8/1998 |

OTHER PUBLICATIONS

Rao; "*TB3+ Activated Green Phosphors for Plasma Display Panel Applications*"; ECS; pp. H165-H171.
Sommerkijk et al.; "*The Behaviour of Phosphors with Aluminate Host Lattices*"; Philips Technical Review; pp. 221-233.

* cited by examiner

Primary Examiner—C. Melissa Koslow
(74) Attorney, Agent, or Firm—Ohlandt, Greeley, Ruggiero & Perle, LLP

(57) ABSTRACT

A green emitting lanthanide aluminate phosphors activated with manganese and alkali halide, and blends thereof, for plasma display panels (PDP) and methods for their preparation are provided. The phosphor has an empirical formula:

$$Ln_{2-x-y}B_{22}O_{36}:Mn_x \cdot A_y$$

wherein Ln is a lanthanide metal selected from the group consisting of: La, Y, Gd, Tb, and a combination thereof, wherein La is: $0.57 \leq La \leq 1.782$; Y is: $0 \leq Y \leq 0.19$; Gd is: $0.198 \leq Gd \leq 0.95$; and Tb is: $0 \leq Tb \leq 0.19$; A is selected from the group consisting of: Li, Na, K and a combination thereof; B is selected from the group consisting of: Al and a combination of Al and Ga; x is $0.01 \leq x \leq 0.1$; and y is $0.01 \leq y \leq 0.1$. These phosphors have a band emission in green region, peaking at 515 nm when excited by 147 and 173 nm radiation from Xenon gas mixture of various compositions, a uniform particle size distribution (0.01 to 10 microns) appropriate for thin phosphor screens required for a variety of flat panel display and lamp applications and exhibit high brightness, good color saturation, good stability and shorter persistence under VUV excitation.

43 Claims, 8 Drawing Sheets

STABLE GREEN PHOSPHOR AND PLASMA DISPLAY PANEL USING THE SAME

BACKGROUND OF THE INVENTION

1. Field of the Invention

The present invention relates to the preparation and growth of small size particles $Mn^{2+}$ and alkali halide doped lanthanide aluminate phosphor by solid sate and sol-gel methods. More specifically, the present invention provides stable green emitting $Mn^{2+}$ and alkali halide doped lanthanide aluminate phosphor and process by thermally decomposing salts of lanthanum, gadolinium, terbium, manganese, alkali halide and alumina or sol-gel powders. To enhance the brightness, phosphor of present invention is blended with other terbium activated green emitting phosphors such as lanthanide borate, lanthanide phosphate or cerium magnesium aluminate.

2. Description of the Related Art

The plasma display panel (PDP) as a medium of large format (60+") television (TV), particularly high definition TVs (HDTV's) is gaining attention over cathode ray tube (CRT) based TVs due to its' high performance and scalability. Although, CRT works with less power and having better picture quality, it has size limitation. Larger screens (CRT) of diagonal size more than 40 inches have larger depth and very heavy. Conversely, diagonal size of PDP is growing day by day, as there is no problem with depth and weight.

The structure of a PDP, which is known in the art, is described in FIGS. 1a and 1b. FIGS. 1a and 1b represents the cross section of an AC PDP. The plasma display has of two large area glass substrates 11, 16. Front plate 11 is made with sustain electrode 12 and scanning electrode 13, covered with thick dielectric layer 14 and a thin protection layer (MgO) 15. Back plate 16 is made with address electrodes 17, reflective layer 18, barrier ribs 19 and red phosphor 20R (Y,Gd)BO$_3$: Eu$^{2+}$, green phosphor 20G ZnSiO$_4$:Mn$^{2+}$ (P1) or the blend of ZnSiO$_4$:Mn$^{2+}$ and Y,GdBO$_3$:Tb$^{3+}$, and blue phosphor 20B BaMgAl$_{10}$O$_{17}$:Eu$^{2+}$ coated by screen printing or ink jet process. Both the glass plates are frit sealed together and filed the space 21 with Xe, Ne gas mixture. When voltage is applied, a discharge is developed in the space 21 producing Vacuum UV (147 and 173 nm). When phosphors 20RGB are excited by VUV photons, they emit respective visible radiations viewed through the transparent front plate as an image 22.

The luminous efficiency of a PDP depends upon various factors including materials such as phosphors, gas mixture, dielectric layer, reflective layer, black matrix, electrodes, cell dimension and shape, nature, size and shape of electrodes, address waveforms, operating voltages, etc. The performance and lifetime of a PDP is strongly related to the nature of phosphors and their resistance to energetic discharge ions, electrons, and solarization from VUV arising from Xe/Ne gas discharge. Compared to standard emissive display such as CRTs (5-6 lm/W), the efficiency of a PDP is low (1-2 lm/W).

To improve the overall efficiency of PDPs, considerable developments related to materials, design, process and electronics are under way. Efforts are also being made to develop new phosphors as well as to improve existing phosphors. Due to vacuum UV specific wavelengths available from Xe discharge (147 nm and 173 nm), only a limited number of lamp phosphors are suitable for PDP applications. In addition to high luminous efficiency, PDP phosphors should have longer life or stability, required persistence, suitable color coordinates, color temperature, and color saturation.

The main application of large area plasma displays will be HDTV and high information content presentation. HDTV and similar type of display devices should have phosphors with low dielectric constant, required decay time, high resolution and high brightness for high performance. Screens coated in a close rib structure or closed cell structure with small particles exhibit higher packing density and also need lesser binder content.

Short time persistence value, which is defined as being 10% of the initial brightness, should be between 4 and 9 ms. Long time persistence, is another concern in selecting a phosphor, and should be less than 0.25% of initial brightness after 2 to 10 seconds. The three phosphors (red, green and blue) currently used in PDP's have different dielectric constants and particle morphology. Due to their physical nature, all of the three phosphors need different rheology of phosphor paste as well as different screening processes. In PDP applications these phosphors exhibit different electrical characteristics in a finished panel. This results in compromises in the performance of the display.

HDTV and similar type of devices should have high resolution and higher brightness for better performance. This can be achieved only with thin phosphor screens formed with very small phosphor particles (1-5 microns) in a close rib structure particularly in the case of PDP's. Screens with small particles have a higher packing density and also require lower binder content. Manganese activated zinc silicate phosphor with or without terbium activated yttrium gadolinium borate is currently used in plasma display panels (PDP) as a green emitting component due to its availability and high quantum efficiency.

The higher dielectric constant of zinc silicate phosphor (P1) is of particular concern as it charges more than its' blue and red counterparts and this results in a higher sustainer voltage. The charging effect on P1 phosphor is higher in presence of higher Xe concentrations (>5%). Higher Xe concentration is need in a PDP to increase the brightness levels. When compared with red and blue emitting phosphors, zinc silicate phosphor (U.S. Pat. No. 5,985,176) also exhibits longer persistence, lower dielectric constant, negative discharge and faster saturation with the VUV flux. Another suitable green candidate, Tb activated yttrium gadolinium borate, which shows lower color purity is described in U.S. Pat. No. 6,004,481. As a trade off, PDP industry is adopting the blend of P1 and Tb activated rare earth borate phosphors. The negative discharge of zinc silicate phosphor has become positive in a blend of zinc silicate phosphor (50%) and rare earth borate based phosphor (50%) in a plasma display panel as described in U.S. Pat. No. 6,753,645 B2. Efforts are being made to develop new phosphors to satisfying all requirements and replace existing Mn activated zinc silicate phosphor or the blend of silicate and borate.

Some other phosphor candidates based on alkali halide aluminates have being mentioned in Phosphor Handbook. U.S. Pat. Nos. 4,085,351, 5,868,963 and 6,423,248 B1 disclose the application of manganese activated aluminate phosphor with either of calcium, strontium, barium, magnesium or zinc in a gaseous discharge light-emitting element. Preparation of Manganese activated lanthanum, yttrium gadolinium aluminate green emitting phosphor excited by VUV ray is described in U.S. Pat. No. 6,805,814. European Patent No. EP 0 908 502 A1 teaches the preparation of barium or strontium magnesium aluminate by firing respective oxides or carbonate in presence of flux (AlF$_3$) at 1450° C. for 48 hours (total time). International Patent Application No. WO 98/37165 describes a method of making oxygen containing phosphor powder, which includes alkaline earth aluminates by spray techniques. European Patent No. EP 1 359 205 A1 describes the method of preparation of various green emitting phosphors has La, Mg, Zn aluminates with Tb, Mn as activators.

Green emitting Mn and alkali metal activated lanthanum aluminate phosphors have been described in the commonly owned, co-pending U.S. Patent Application Publication No. 2005/0194570 A1, filed Mar. 2, 2004, entitled "Green Emitting Phosphor Material and Plasma Display Panel Using the Same," the contents of which are incorporated herein by reference.

Other related aspects to such phosphors are described in U.S. Pat. Nos. 4,150,321; 5,989,455; and 6,222,312 B1; European Patent No. 0 697 453 A1; International Patent No. WO 98/37165 by Hampden-Smith Mark, et al.

Further aspects to such phosphors are described in publications entitled (1) "Fluorescence in β-Al$_2$O$_3$-like materials of K, Ba, La activated with Eu$^{2+}$ and Mn$^{2+}$" by M. Tamatani, Jap. J. Applied Physics, Vol. 13, No. 6, June 1974 pp 950-956; (2) "The behavior of phosphors with aluminate host lattices" by J. L. Sommerdijk and A. L. N. Stevels, Philips Tech. Review Vol. 37, No. 9/10, 1977 pp 221-233; and (3) "Principal phosphor materials and their optical properties" by M. Tamatani in "Phosphor Handbook" edited by S. Shionoya and W. M. Yen, CRC Press (1999) pp. 153-176 and "Tb$^{3+}$ activated green phosphors for plasma display panel applications" by R. P. Rao, J. Electrochemical Society Vol. 150 (2003) pp H165-171.

However, none of these patents and publications describe a green emitting Mn and alkali metal activated lanthanide aluminate phosphor according to the present invention.

SUMMARY OF THE INVENTION

Accordingly, it is an object of the present invention to provide a phosphor and method of preparation of manganese activated and alkali halide lanthanide aluminate phosphor.

The present invention provides a green emitting Mn and alkali metal activated lanthanide aluminate phosphor having the empirical formula:

$$Ln_{(2-x-y)}B_{22}O_{36}:Mn_x \cdot A_y$$

wherein:

Ln is a lanthanide metal selected from the group consisting of: La, Y, Gd, Tb, and a combination thereof, wherein in said combination, La is: $0.57 \leq La \leq 1.782$; Y is: $0 \leq Y \leq 0.19$; Gd is: $0.198 \leq Gd \leq 0.95$; and Tb is: $0 \leq Tb \leq 0.19$;

A is selected from the group consisting of: Li, Na, K and a combination thereof;

B is selected from the group consisting of: Al and a combination of Al and Ga;

x is from about 0.01 to about 0.1; and y is from about 0.01 to about 0.1.

The present invention further provides a method of producing a green emitting Mn and alkali metal activated lanthanide aluminate phosphor having the empirical formula:

$$Ln_{(2-x-y)}B_{22}O_{36}:Mn_x \cdot A_y$$

wherein:

Ln is a lanthanide metal selected from the group consisting of: La, Y, Gd, Tb, and a combination thereof, wherein in said combination, La is: $0.57 \leq 1.782$; Y is: $0 \leq Y \leq 0.19$; Gd is: $0.198 \leq Gd \leq 0.95$; and Tb is: $0 \leq Tb \leq 0.19$;

A is selected from the group consisting of: Li, Na, K and a combination thereof;

B is selected from the group consisting of: Al and a combination of Al and Ga;

x is from about 0.01 to about 0.1; and y is from about 0.01 to about 0.1.

wherein the method includes the steps of:

mixing a source of an alkali metal, a source of manganese, a source of lanthanide, and a source of aluminum in an acid medium to form dilute aqueous solution;

removing at least a portion of water from the dilute aqueous solution to form a gel;

heating the gel at a temperature sufficient to remove excess water thereby converting the gel into a gel powder; and thermally decomposing the gel powder at a temperature and for a length of time sufficient to produce the phosphor.

The present invention still further provides a solvent free method of producing a green emitting Mn and alkali metal activated lanthanide aluminate phosphor having the empirical formula:

$$Ln_{(2-x-y)}B_{22}O_{36}:Mn_x \cdot A_y$$

wherein:

Ln is a lanthanide metal selected from the group consisting of: La, Y, Gd, Tb, and a combination thereof, wherein in said combination, La is: $0.57 \leq La \leq 1.782$; Y is: $0 \leq Y \leq 0.19$; Gd is: $0.198 \leq Gd \leq 0.95$; and Tb is: $0 \leq Tb \leq 0.19$;

A is selected from the group consisting of: Li, Na, K and a combination thereof;

B is selected from the group consisting of: Al and a combination of Al and Ga;

x is from about 0.01 to about 0.1; and y is from about 0.01 to about 0.1.

the method includes the steps of:

mixing a source of an alkali metal, a source of manganese, a source of lanthanide and a source of aluminum to form a powder mixture; and thermally decomposing the powder mixture at a temperature and for a length of time sufficient to produce the phosphor.

The present invention also provides an improved plasma display panel (PDP), having a front plate with electrodes, dielectric layer, a thin protecting layer (MgO), a back plate with electrodes, reflective layer, ribs, phosphors, and a plurality of discharge spaces filled with gas mixture contains different compositions of Xe (5 to 50%) and Ne (95 to 50%) between the front and back plates having phosphor layers, wherein the improvement includes a plasma display panel which includes a green emitting phosphor material according to the present invention.

DETAILED DESCRIPTION OF THE INVENTION

Figure 1A:
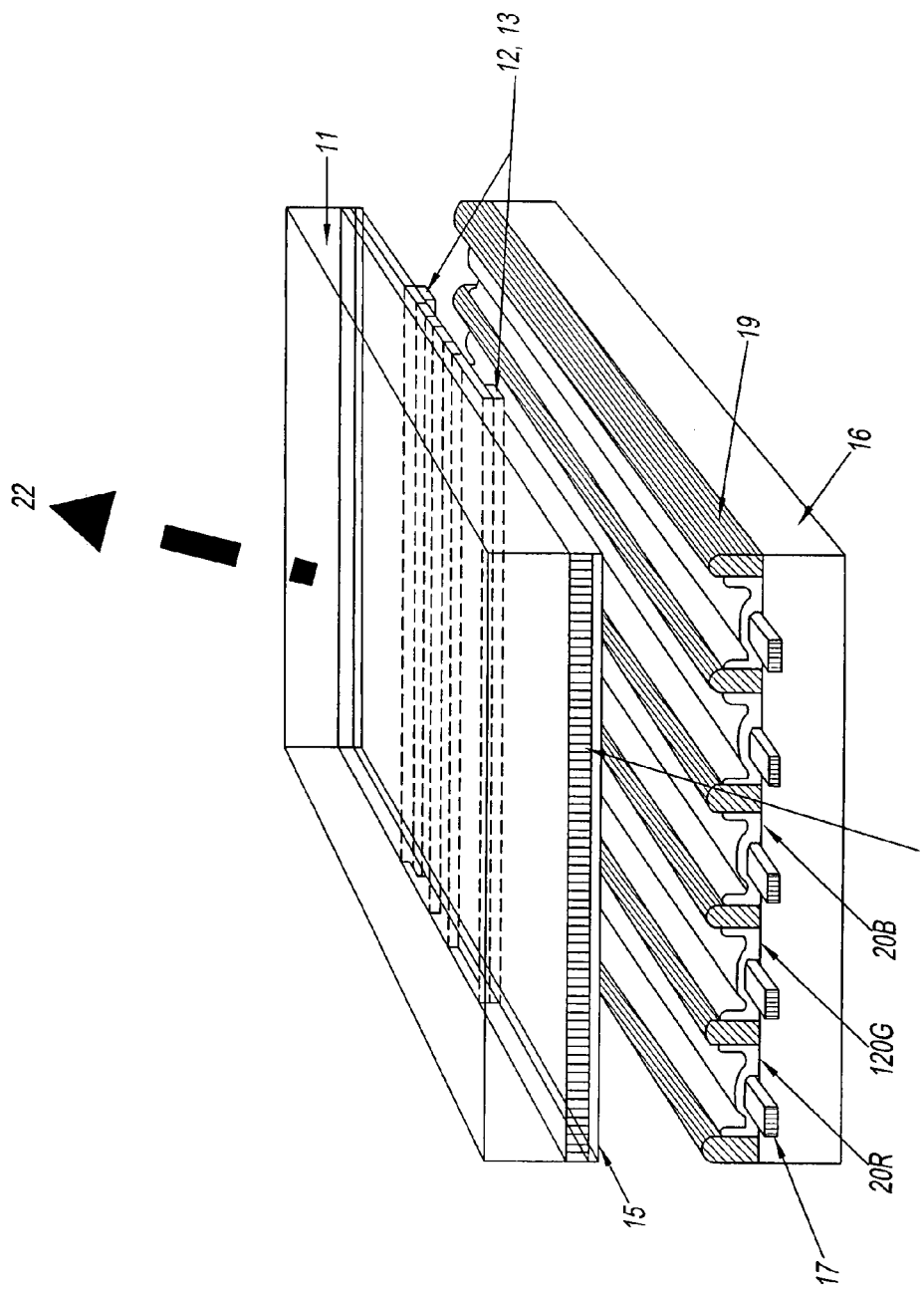
FIG. 1*a* represents cross sectional view of AC plasma display panel (prior art).

The present invention provides a method of preparation and growth of small size particles $Mn^{2+}$ and alkali halide doped lanthanide (La, Y, Gd, Tb) aluminate phosphor, particularly green emitting $Mn^{2+}$ and alkali halide doped lanthanide aluminate phosphors, by solid sate and sol-gel methods.

The phosphor is prepared by thermally decomposing the powder obtained by method including the steps of: mixing a source of alkali, such as, an alkali metal salt, a source of manganese, a source of lanthanum, a source of yttrium, a source of gadolinium, a source of terbium and a source of aluminum; reacting a dilute solution including a source of alkali halides, a source of lanthanum, a source of yttrium, a source of gadolinium, a source of terbium a source of manganese and an organic precursor providing a source of aluminum, in an acid medium to form a dilute gel (sol-gel process); and converting the dilute gel into a xerogel powder (room temperature drying); converting the dilute gel into an aerogel powder (vacuum drying); or converting the dilute gel into a gel powder (spray drying), at specified temperatures, having a band emission in green region, peaking at 515-516 nm when excited by 147 and 173 nm radiation from Xenon gas mixture.

The present invention also provides comparative performance data on the lanthanide aluminate phosphors that are activated with manganese ($Mn^{2+}$) and alkali halide such as lithium ($Li^+$) synthesized by two different processes: conventional solid-state reaction process (0.1 to 10 microns) and sol-gel process (0.01 to 5 microns).

Phosphor materials are extremely sensitive to impurities, even at ppb levels. The low-temperature process minimizes the potential for cross contamination. Some of the unwanted impurities left in the materials from high temperature calcination may pose a threat to the performance of a phosphor. As the size of the phosphor particle decreases, the probability of electron and hole capture to the impurity increases and the e-h localization enhances the recombination rate via the impurity. The optimum impurity concentration (activator) level can be further increased with small particle size. This can be achieved by starting with sub micron size starting chemicals or sol gel process.

The green phosphor of the present invention is capable of absorbing the photons of vacuum ultra violet light and converting them into photons of visible light. The brightness of the present phosphor can be improved by blending the green phosphor of the present invention with green emitting phosphor such as Tb activated yttrium gadolinium borate or lanthanum borate or magnesium aluminate. Accordingly, the green phosphor described herein is suitable to use in lamps and displays.

The salts of lanthanum, yttrium, gadolinium, terbium, manganese, alkali halide and alumina or sol-gel powders obtained from dilute solution including a source of an lanthanum, a source of yttrium, a source of gadolinium, a source of terbium, a source of manganese and an organic precursor providing a source of aluminum, in an acid medium (sol-gel process) or xerogel powder (drying gel from sol-gel process at room temperature) or aerogel powder (drying the gel from sol-gel in vacuum), or gel powder obtained by spray drying, are thermally decomposed at temperature (1000 to 1400° C. for 2 to 6 hours in air and retired at 1000-1300° C. in presence of forming gas (95.5% N2 and 4.5% H2) for 2 to 6 hours.

The present invention provides a green emitting Mn and alkali metal (i.e., Li, Na or K) activated lanthanide aluminate phosphor having the empirical formula:

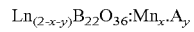

$Ln_{(2-x-y)}B_{22}O_{36}:Mn_x.A_y$ wherein:

Ln is a lanthanide metal selected from the group consisting of: La, Y, Gd, Tb, and a combination thereof, wherein in said combination, La is: $0.57 \leq La \leq 1.782$; Y is: $0 \leq Y \leq 0.19$; Gd is: $0.198 \leq Gd \leq 0.95$; and Tb is: $0 \leq Tb \leq 0.19$;

A is selected from the group consisting of: Li, Na, K and a combination thereof;

B is selected from the group consisting of: Al and a combination of Al and Ga;

x is from about 0.01 to about 0.1; and y is from about 0.01 to about 0.1.

The green emitting manganese-activated lanthanide aluminate phosphor particles have a uniform particle size distribution (0.01 to 10 μm) that are suitable for use in plasma display panels (PDP). Such particles can be prepared from respective oxides, nitrates, oxalates and organic precursors which form small particles that improve the performance parameters of higher brightness, shorter persistence, better stability, longer life and good color saturation in PPD applications.

There are a number of display applications where a phosphor with high brightness, shorter persistence, colors purity (saturation), better stability and long life span (time of operation) would significantly improve the display's performance. In a display, the green component is very important, as the human eye photonic response has its peak sensitivity at approximately 535 nm (green component of the visible spectrum).

Since commercially available phosphor based on Mn activated zinc silicate or barium magnesium aluminate and terbium activated yttrium, gadolinium borate fail to satisfy all the above requirements, a new phosphor and its synthesis process that overcomes the above limitations was developed.

The green phosphor according to the present invention is capable of absorbing the photons of vacuum ultra violet light and converts into photons of visible light and is suitable to use in lamps and displays. Further, the small size phosphor particles are particularly suitable for use in applications in which a high packing density is required. The result of this development effort is the basis of the present invention. This invention provides $Mn^{2+}$ and alkali metal$^{1+}$ activated lanthanide aluminate phosphor, method of synthesizing and uses the same in PDP's.

As mentioned above, the phosphor can be prepared by a method having the steps of:

mixing a source of an alkali, a source of manganese, a source of lanthanide and a source of aluminum in an acid medium to form dilute aqueous solution;

removing at least a portion of water from the dilute aqueous solution to form a gel;

heating the gel at a temperature sufficient to remove excess water thereby converting the gel into a gel powder; and thermally decomposing the gel powder at a temperature and for a length of time sufficient to produce the phosphor.

The present invention further provides a solvent free method of producing a green emitting Mn and alkali metal activated lanthanide aluminate phosphor having the empirical formula:

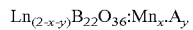
$$Ln_{(2-x-y)}B_{22}O_{36}:Mn_x \cdot A_y$$

wherein:

Ln is a lanthanide metal selected from the group consisting of: La, Y, Gd, Tb, and a combination thereof, wherein in said combination, La is: $0.57 \leq La \leq 1.782$; Y is: $0 \leq Y \leq 0.19$; Gd is: $0.198 \leq Gd \leq 0.95$; and Tb is: $0 \leq Tb \leq 0.19$;

A is selected from the group consisting of: Li, Na, K and a combination thereof;

B is selected from the group consisting of: Al and a combination of Al and Ga;

x is from about 0.01 to about 0.1; and y is from about 0.01 to about 0.1.

wherein the method includes the steps of:

mixing a source of an alkali metal, a source of manganese, a source of lanthanide and a source of aluminum to form a powder mixture; and thermally decomposing the powder mixture at a temperature and for a length of time sufficient to produce the phosphor.

The source of alkali metal is an alkali metal salt, the source of lanthanide is a lanthanide salt, the source of manganese is manganese salt, and the source of aluminum is an organic precursor providing aluminum.

Preferably, the alkali metal salt is selected from alkali halides, alkali nitrate, alkali carbonate, alkali hydroxide, and mixtures thereof; the lanthanide salt is selected from lanthanide oxalate, lanthanide nitrate, lanthanide oxide, and mixtures thereof; the manganese salt is selected from manganese halides, manganese nitrate, manganese carbonate, manganese hydroxide, and mixtures thereof; and the organic precursor providing aluminum is selected from aluminum isopropoxide, aluminum s-butoxide, and mixtures thereof.

In a preferred embodiment, the source of lanthanide is lanthanide oxalate, lanthanide nitrate, lanthanide oxide, or mixtures thereof; the alkali metal salt is alkali halide, alkali nitrate, alkali carbonate, alkali hydroxide, or mixtures thereof; and the source of aluminum is aluminum oxide, aluminum isopropoxide, aluminum s-butoxide, or mixtures thereof.

The gel can be sprayed ultrasonically and dried, i.e., spray dried, to form a gel powder prior to thermal decomposition. The gel can also be vacuum dried to form an aero-gel, and the aero-gel can be crushed to form a powder prior to thermal decomposition. The gel can also be dried to form a xerogel and the xero-gel can be crushed to form a powder prior to thermal decomposition. The gel can be thermally decomposed in an open atmosphere at a temperature from about 1000° C. to about 1400° C. and then at a temperature from about 1000° C. to about 1300° C. in forming gas.

Preferably, the phosphor has a particle size from about 0.01 microns to about 10.0 microns and exhibits a relative intensity (AU) at 147 nm excitation from about 90 to about 100 and relative intensity (AU) at 173 nm excitation from about 90 to about 105 with half width from about 23 to about 25 nm, a short time persistence (10% of initial intensity) from about 7 ms to about 10 ms, a long time persistence (0.25% of initial intensity) from about 2 to 6 seconds, a color coordinates of x from about 0.120 to about 0.140 and y from about 0.770 to about 0.790.

Accordingly, the phosphor can be prepared by thermally decomposing a powder obtained by mixing a source of alkali, such as, an alkali metal salt, a source of manganese, a source of lanthanum, a source of yttrium, a source of gadolinium, a source of terbium and a source of aluminum; reacting a dilute solution including a source of alkali halides, source of lanthanides, a source of manganese and an organic precursor providing a source of aluminum, in an acid medium to form a dilute gel (sol-gel process); and converting the dilute gel into a xero-gel powder (room temperature drying); converting the dilute gel into an aero-gel powder (vacuum drying); or converting the dilute gel into a gel powder (spray drying), at specified temperatures.

The formation of the lanthanide aluminate solid solution is critical and is highly dependent on the reaction temperature and conditions. In this invention, an aqueous based process is adopted along with solid state by considering the cost and availability of the starting chemicals. Since the purity of starting chemicals is very important to the synthesis of phosphors, the starting chemicals are typically 99.9-99.999% in purity. It is important to minimize the concentration of specific contaminants such as Fe, Co, Ni, which can seriously degrade the phosphor performance.

Required metal (La, Y, Gd, Tb, Mn, Li, Na and K) solutions are also prepared by mixing appropriate amounts of respective metal nitrates in a lukewarm DI water to obtain 0.05-0.1M solutions. The metal hydroxide precursor was prepared by precipitating an aqueous solution of metal chloride or metal nitrate (0.01-0.05M) in water by the addition of a base such as ammonium hydroxide to the solution. Stoichioemetric quantities of metal solutions and aluminium isopropoxide or aluminum s-butoxide are mixed. The metal/isopropoxide or aluminum s-butoxide solution is transferred to a round bottom flask and peptized at 80-100° C. for 9-18 hours in a stirrer mantle. In the present invention inorganic acid such as $HNO_3$ or HCl have been employed to maintain a low pH which is required to effect gelation.

After the pepitization, sol/gels are left in a container until they become a thick gel (3-5 days) and then a xerogel. Aerogels are also prepared from the same dilute gels by extracting the water and other solvents in a vacuum through a cold trap. These xerogels or aerogels are transferred into a lab oven at 60-70° C. and left for a day or until becoming powder. This step is inserted to accelerate the removal of any resisdual solvent. Gel powders are also prepared by spray drying. Dilute gels are sprayed through a fine nebulizer into a 4" diameter glass tubing which has been heated to 120-150° C. An alternate process for forming particles can be accomplished using an ultrasonic aerosol generator. After drying, gel powder is collected and fired for 2 hours at 400° C. to burn-out residual organic components.

Required amounts of metal salts such as oxalates, carbonates, fluorides of La, Y, Gd, Tb, Li, Mn are mixed with aluminum oxide preferably gamma-alpha alumina of 0.01-0.02 micron powder with surface area 100 m$^2$/g and flux materials such as ammonium fluoride in a mortar and pestle. The charge contains mixed powders of solid state or powders obtained from sol-gel process is transferred into high grade alumina crucibles and calcined in air at 1000 to 1500° C. for 2 to 6 hours. The fired powders are transferred in to high grade alumina boats and refired in a tube furnace in presence of forming gas (4.5% of H$_2$ and 95.5% of N$_2$) at 1000 to 1300° C. for 2 to 6 hours. Reducing atmosphere such as forming gas or carbon monoxide or equivalent helps to change the Mn$^{3+}$ and higher states to divalent manganese state (Mn$^{2+}$).

The powder can be thermally decomposed in an open atmosphere at 1300° C. and then at a temperature equal 1200° C. in a forming gas contains 4.0 to 5.0% of H$_2$ and remaining N$_2$. Luminescent characteristics of phosphors prepared as mentioned above are shown in Table I with examples.

Preferably, the phosphor has a particle size in the range of 0.01 to 10.0 microns. The powder has a particle size in the range of 0.05 to 5.0 microns, preferably 0.01 to 3.0 microns, more preferably, 0.01 to 0.02 microns.

Preferably, the phosphor has from about 1.8 mole to about 1.98 mole of lanthanide, from about 0.01 mole to about 0.1 mole of manganese, about 0.01 mole to about 0.1 mole of alkali metal, and 22.0 mole of aluminum.

FIG. 1a represents cross sectional view of AC plasma display panel.

Figure 1B:
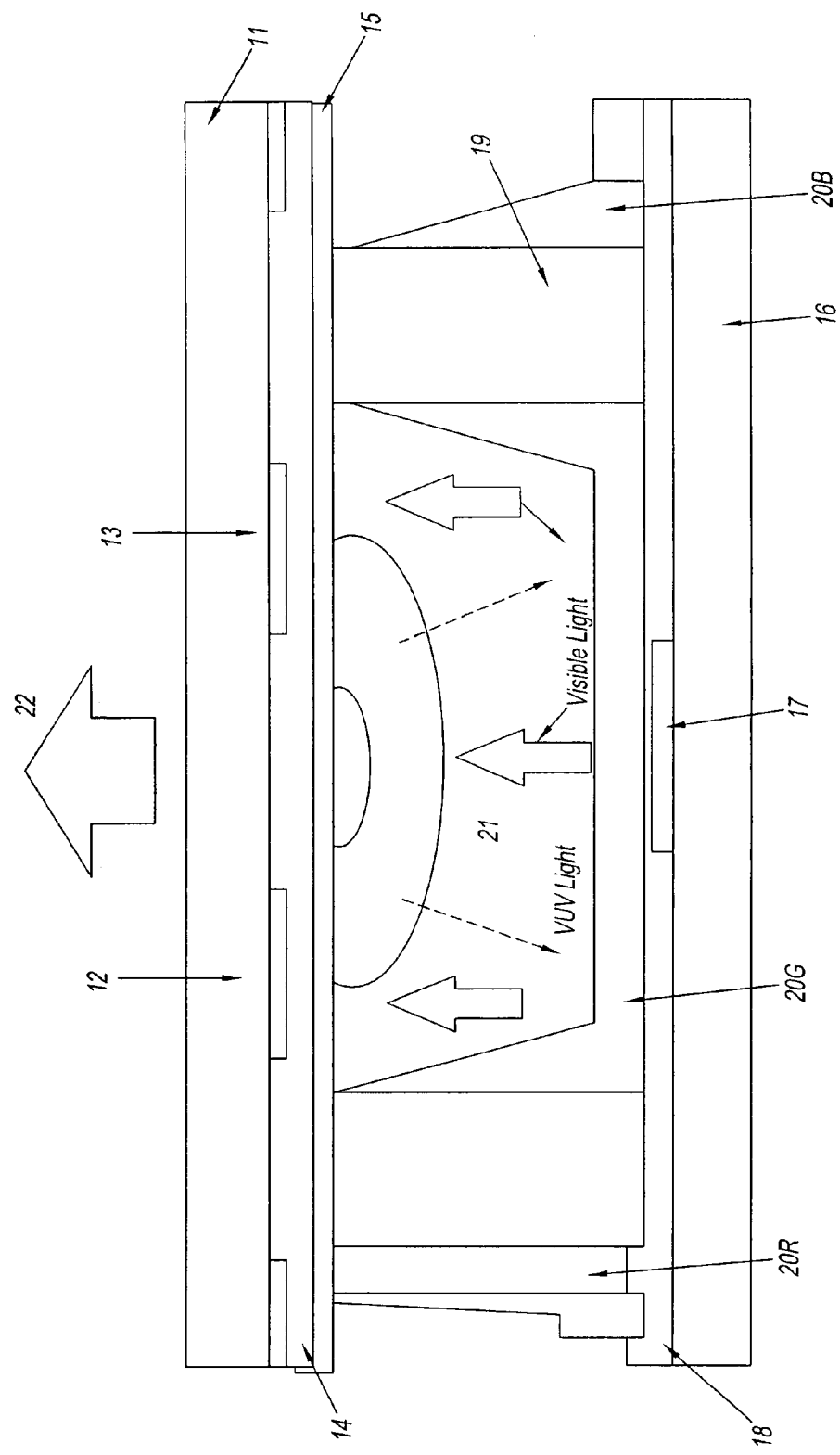
FIG. 1*b* represents cross sectional view of single cell with three different phosphors (prior art).

FIG. 1b represents cross sectional view of single cell with three different phosphors.

Figure 2:
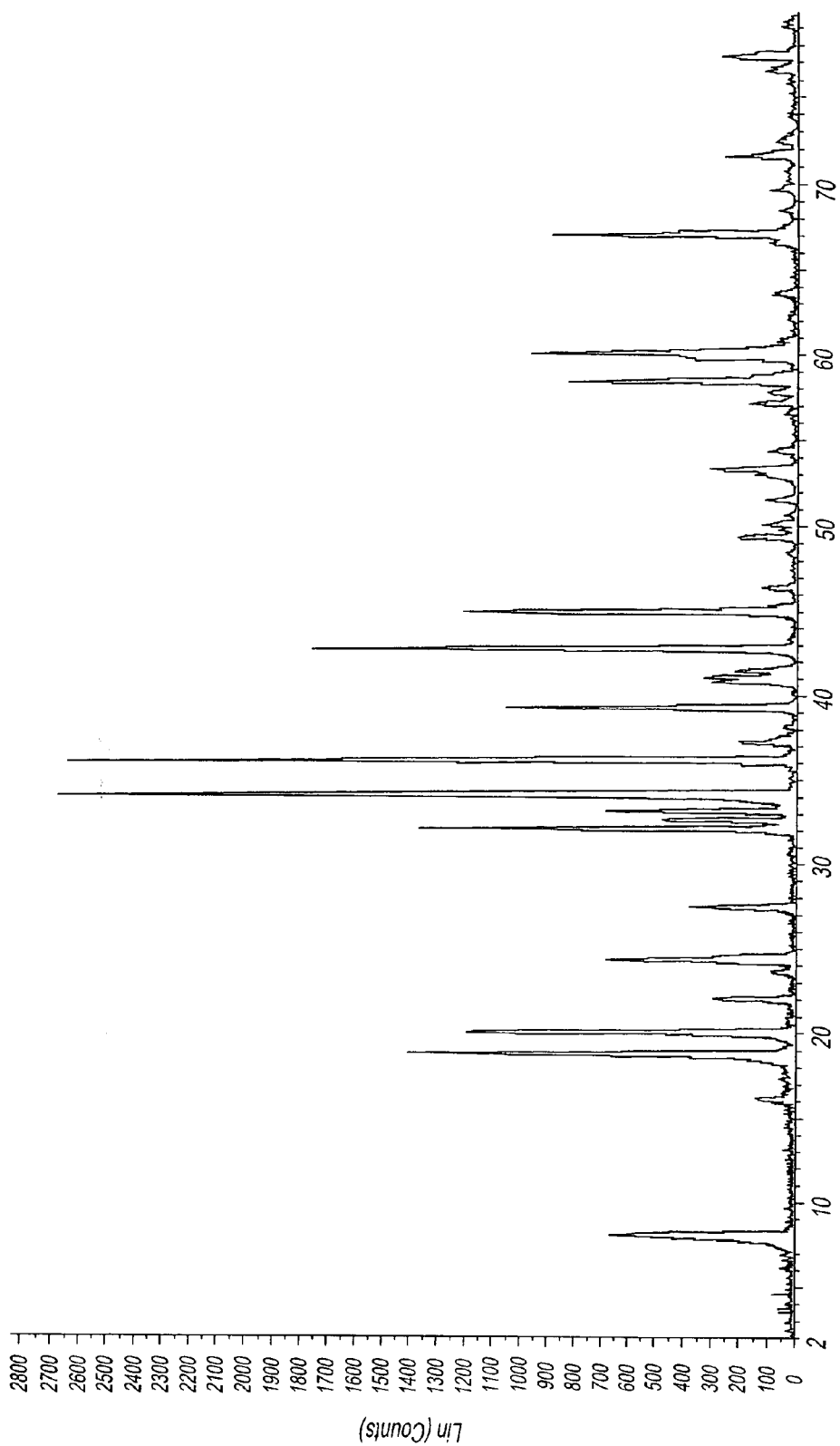
FIG. 2 shows X-ray powder diffraction pattern of Mn and Li activated lanthanide aluminate phosphor.

X-ray powder diffraction data on sample fired at 1400° C. and refired at 1200° C. (N$_2$+H$_2$) is shown in FIG. 2. The lines corresponding to lanthanum aluminate phase are more prominent above 1000° C. of firing temperature. Since the luminescence of a phosphor depends on the shape, size, crystallinity, defects and grain boundaries, the morphology and particle size distribution (PSD) of all the samples prepared at various conditions were studied.

Figure 3:
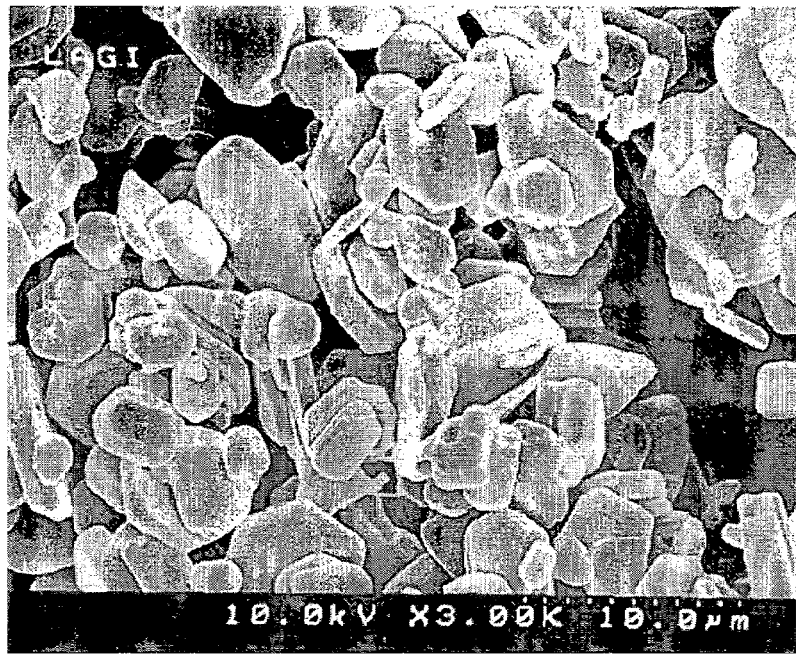
FIG. 3 illustrates a scanning electron micrograph of Mn and Li activated lanthanide aluminate phosphors.
Figure 3A:
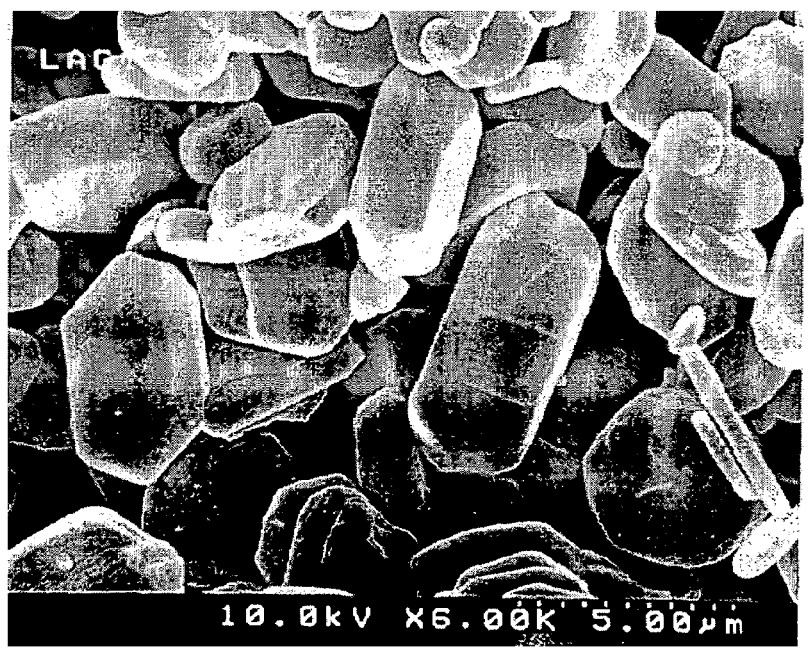
FIG. 3*a* illustrates the scanning electron micrograph of FIG. 3, at a higher resolution.

FIG. 3 illustrates the scanning electron micrographs of Mn and Li activated lanthanide aluminate phosphor. From the photomicrographs in FIG. 3, one can observe that the phosphor particles are uniform in size and well crystallized.

Figure 4:
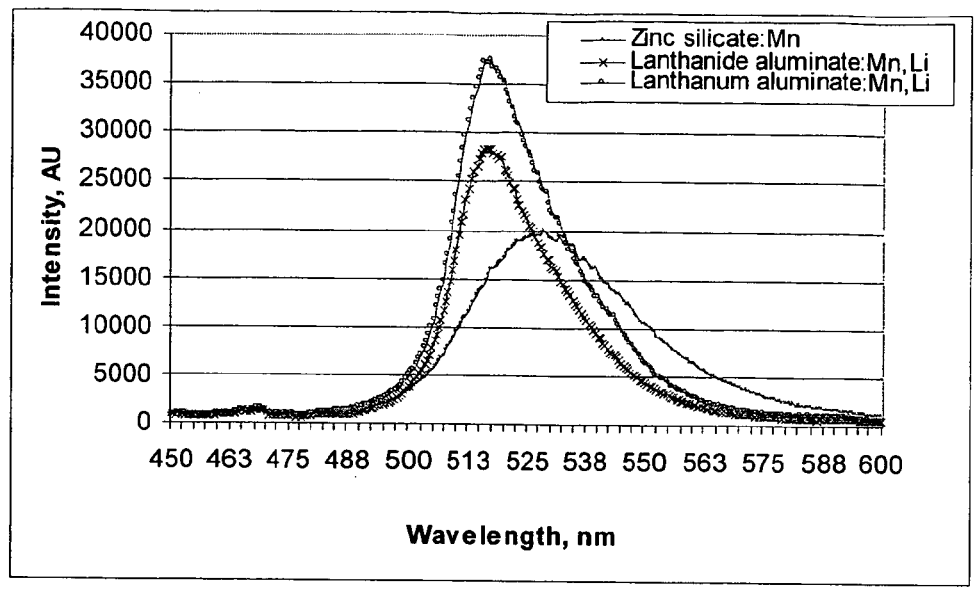
FIG. 4 shows emission spectra of Mn and Li activated lanthanide aluminate phosphor of present invention and lanthanum aluminate phosphor and Mn activated zinc silicate phosphor excited at 147 nm. The emission was recorded at room temperature.

FIG. 4 shows emission spectra of Mn and Li activated lanthanum aluminate phosphor, lanthanide aluminate phosphor of present invention and Mn activated zinc silicate phosphor excited at 147 nm. The emission was recorded at room temperature.

To enhance the brightness of the phosphor of present invention, yellow emitting borate based phosphor such as terbium-activated yttrium, gadolinium borate or lanthanum phosphate or magnesium aluminate phosphors up to 50% is mixed with the green emitting phosphor of present invention.

Figure 5:
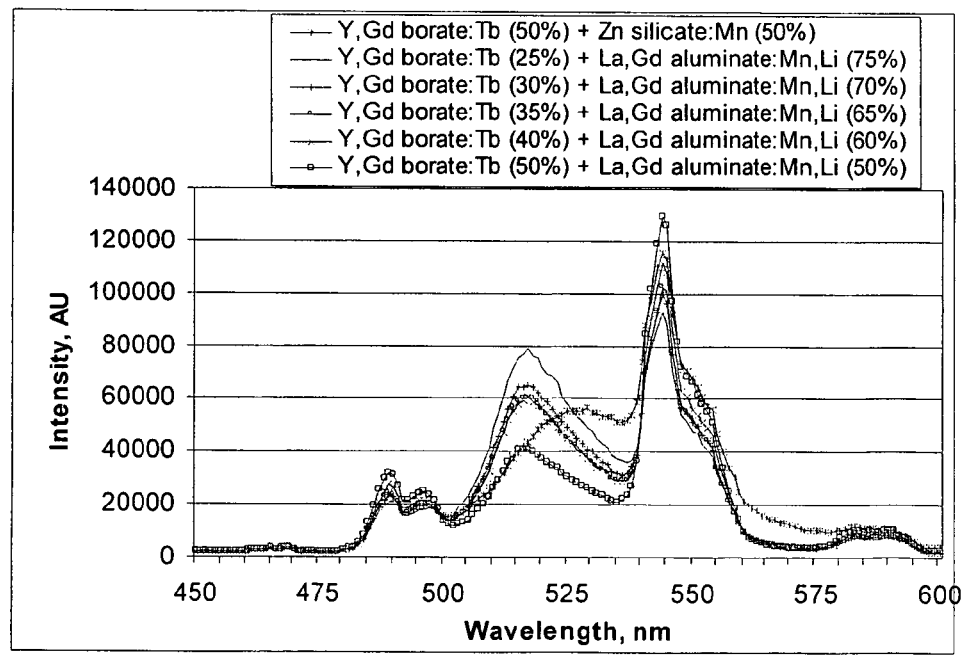
FIG. 5 shows emission spectra of blends of various compositions of Mn and Li activated lanthanide aluminate phosphor of present invention and terbium activated yttrium, gadolinium borate phosphors excited at 147 nm. The emission was recorded at room temperature.
Figure 6:
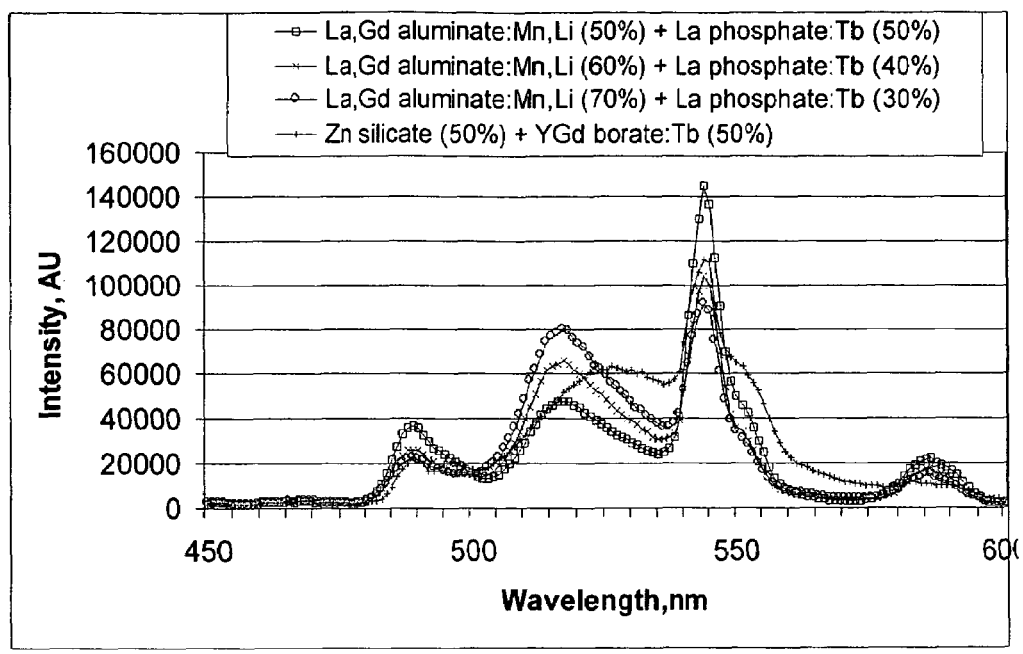
FIG. 6 shows emission spectra of blends of various compositions of Mn and Li activated lanthanide aluminate phosphor of present invention and terbium activated lanthanum phosphate phosphor excited at 147 nm. The emission was recorded at room temperature.

FIGS. 5 and 6 represent the emission spectra of blends of various compositions of Mn and Li activated lanthanide aluminate phosphor of present invention and terbium-activated yttrium, gadolinium borate or lanthanum phosphate phosphor excited at 147 nm. The emission was recorded at room temperature.

Figure 7:
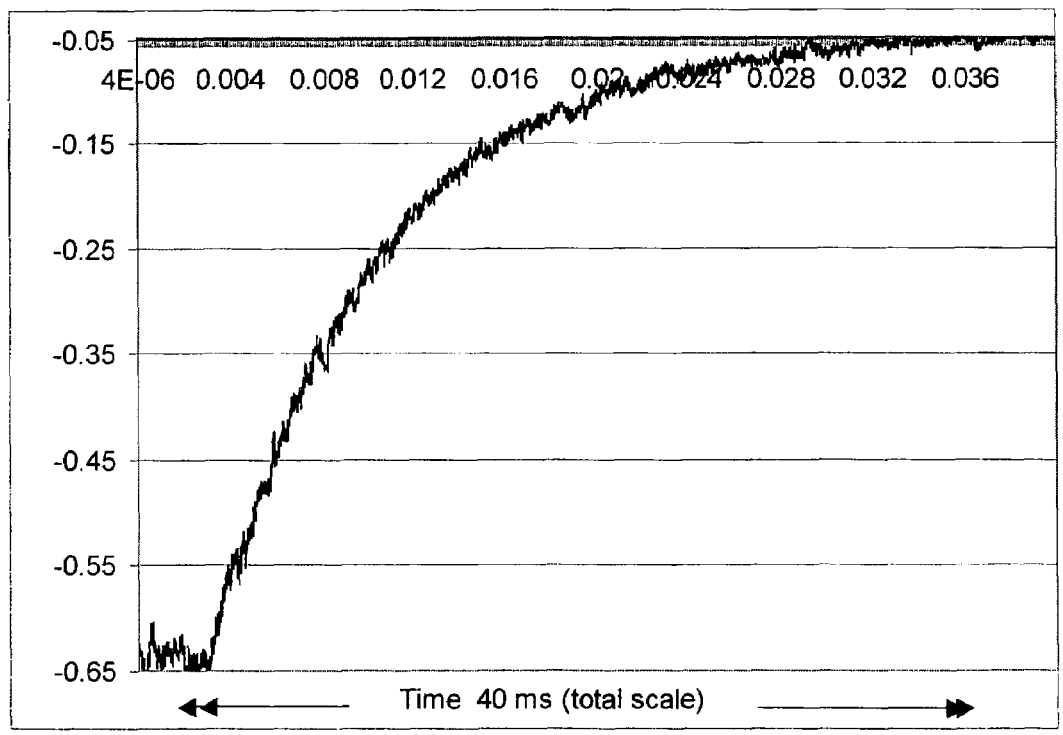
FIG. 7 shows persistence (short time) of Mn and Li activated lanthanum aluminate phosphor and lanthanide (La, Gd, Tb) aluminate phosphor of present invention recorded at room temperature (excitation source custom made Xenon lamp with 147 nm filter).

Short time persistence or after glow decay characteristic (10% of initial intensity) of lanthanide aluminate phosphor activated with Li and Mn recorded at room temperature while exciting with Xe lamp (147 nm) is shown in FIG. 7.

Figure 8:
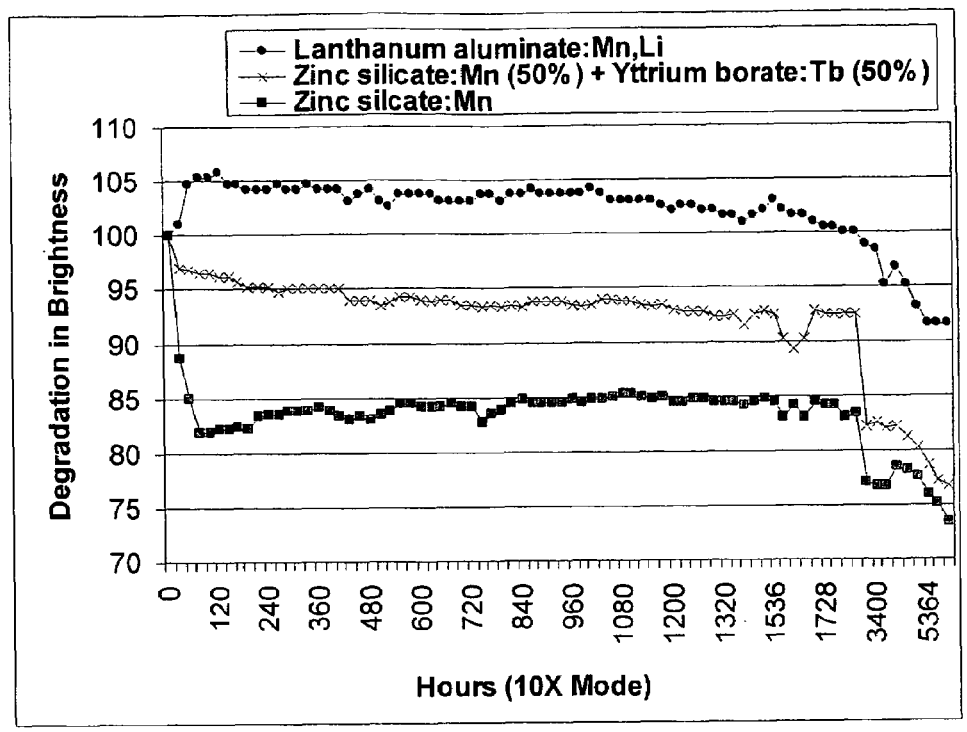
FIG. 8 shows the degradation in brightness of Mn and Li activated lanthanum aluminate phosphor along with P1 phosphor and a blend of P1 (50%) and Tb activated rare earth borate (50%) in a 42" test panel filled with 6% Xenon gas operated at 10× mode.

Referring to FIG. 8, degradation of the present phosphor along with other green emitting phosphor material (ZnSiO$_4$:Mn), in a 42" test panel with 6% xenon can be seen. When compared with the standard ZnSiO$_4$:Mn phosphor, the degradation of Mn and Li activated lanthanide aluminate phosphor is low.

Figure 9:
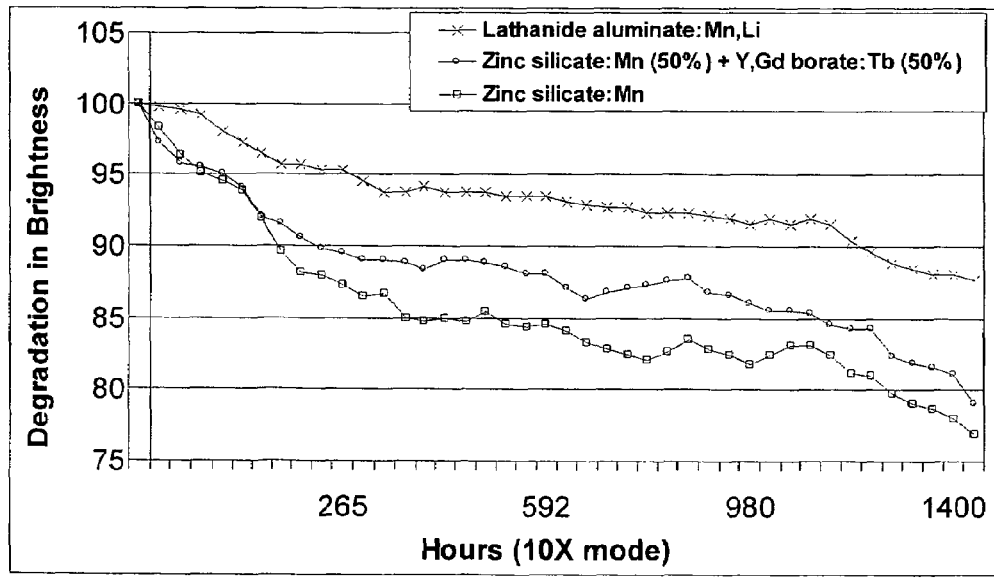
FIG. 9 shows the degradation in brightness of Mn and Li activated lanthanide (La, Gd, Tb) aluminate phosphor, phosphor blend of the phosphor of present invention and Tb activated rare earth borate s phosphor along with P1 phosphor and a blend of P1 (50%) and Tb activated rare earth borate (50%) in a 42" test panel filled with 15% Xenon gas operated at 10× mode.

FIG. 9 shows the degradation of the present phosphor along with other green emitting phosphor material (ZnSiO$_4$:Mn), in a 42" test panel with 15% xenon can be seen. When compared with the standard ZnSiO$_4$:Mn phosphor, the degradation of Mn and Li activated lanthanide aluminate phosphor is low.

Figure 10:
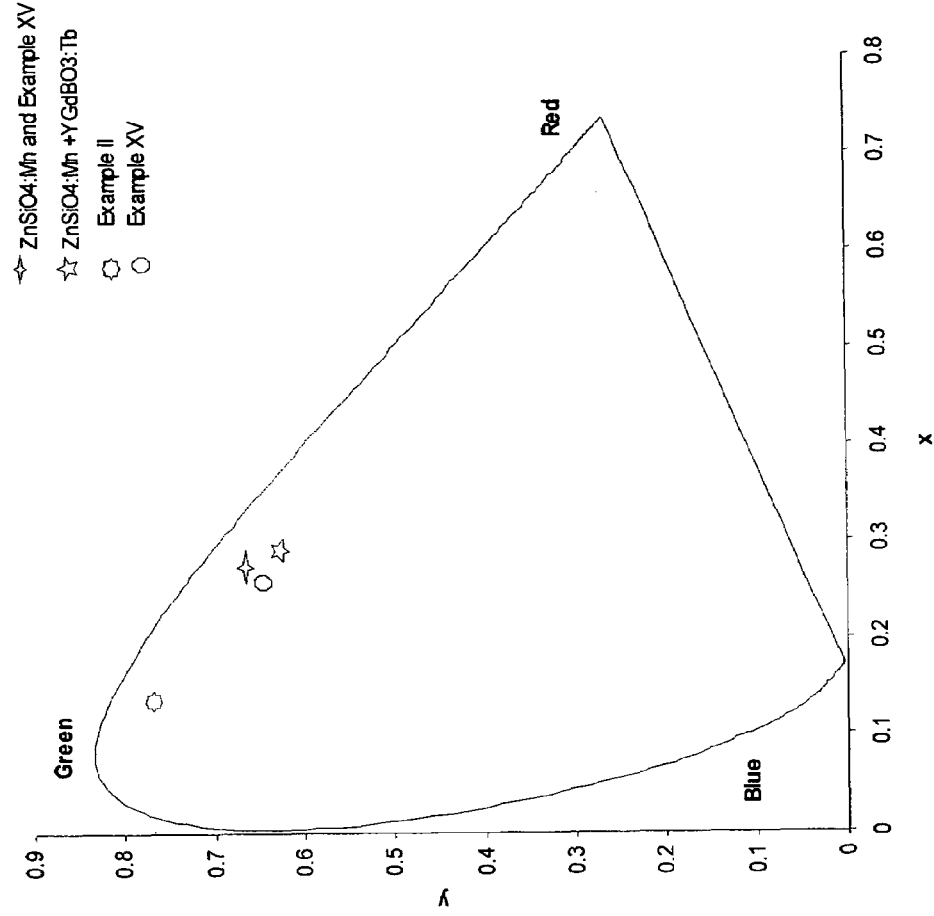
FIG. 10 shows the variation of color points in a CIE chart of various green emitting phosphors including the phosphor of present invention obtained from 42" test panel (15% Xe).

The color purity of the phosphor of present invention is determined by studying the color coordinates and compared with other green emitting PDP phosphors. FIG. 10 represents CIE diagram where color points from phosphor of present invention and blends with other standard phosphors are located.

Preferably, the phosphor pastes are prepared by mixing the phosphor powders with a suitable vehicle contains a solvent (terpineol or butyl carbolite acetate (BCA)/butoxyethoxy ethyl acetate) and a binder (ethyl cellulose or polyvinyl butyral).

The vehicle is premixed in a high speed vertical stirrer by adding require amounts of solvent and binder. The phosphor paste is rolled in a three-roller grinder until the paste become very soft. Pastes of different phosphor are screen printed on small circular glass coupons (1"dia).

After drying the glass plates with phosphor pastes at 120 to 140° C. is subjected to binder burn out process at 500° C. for 1 to 4 hours until all the organics are evaporated. Same pastes are being used in make back plate of 42" test panels.

The study of luminescent and life characteristics of these phosphor materials are carried out on the glass coupons as well as in 42" test panels. Degradation of these with exposure of UVU radiation is calculated by measuring the intensity before and after exposing the phosphor screens to high energy Xe flash lamp in N$_2$ atmosphere or Xe lamp in vacuum for different durations of time. It is found that the degradation of the present phosphor is minimal when compared to other PDP green emitting phosphors.

After preliminary studies in the laboratory, suitable phosphor pastes are screen printed on back plate (42"). After binder-burn out (500° C.), the back plate with phosphor is frit sealed with front plate and filled with different concentrations of Xe—Ne gas mixtures.

After backing cycle with gas fill, the assembly (front and back plate) is connected to all required electronics. Luminescent properties such as brightness, intensity, spectral energy distribution, after glow decay (short and long time), color coordinates, color temperature, etc., stability or life span and electrical characteristics, such as, capacitance, discharge leakage, discharge delay, variation in sustain voltage, and ramp voltage, are studied on these panels. Some of results obtained from these panels are shown in Table II.

Various blends of the phosphors of the present invention are also useful in the preparation of the panels according to the present invention. Such blends can be prepared by mixing the green emitting phosphor according to the present invention with, for example, a rare earth borate, a rare earth phosphate or a magnesium aluminate.

Accordingly, the present invention further includes:

(a) a blend including a phosphor according to the present invention and 10% to 50% by wt. of a Tb activated rare earth borate;

(b) a blend including a phosphor according to the present invention and 10 to 25% by weight of Mn activated zinc silicate and 10 to 25% of Tb activated rare earth borate;

(c) a blend including a phosphor according to the present invention and 10% to 50% by wt. of Tb and Ce activated rare earth phosphate; and (d) a blend including a phosphor according to the present invention and 10% to 50% by wt. of Tb and Ce activated magnesium aluminate.

The phosphor material of the present invention emits green light when excited by vacuum ultra violet light of wavelength in the range of 100 nm to 200 nm and, as such, is suitable for use in plasma display panels and lamps.

Accordingly, the present invention provides an improved plasma display panel (PDP), having a front plate with electrodes, dielectric layer, a thin protecting layer (MgO), a back plate with electrodes, reflective layer, ribs, phosphors, and a plurality of discharge spaces formed between the front and back plates having phosphor layers, wherein the improvement includes:

a plasma display panel having a green emitting phosphor material with a composition represented by the formula:

$$Ln_{2-x-y}B_{22}O_{36}:Mn_x·A_y$$

wherein:

Ln is a lanthanide metal selected from the group consisting of: La, Y, Gd, Tb, and a combination thereof, wherein in said combination, La is: $0.57 \leq La \leq 1.782$; Y is: $0 \leq Y \leq 0.19$; Gd is: $0.198 \leq Gd \leq 0.95$; and Tb is: $0 \leq Tb \leq 0.19$;

A is selected from the group consisting of: Li, Na, K and a combination thereof;

B is selected from the group consisting of: Al and a combination of Al and Ga;

x is from about 0.01 to about 0.1; and y is from about 0.01 to about 0.1.

Preferably, the phosphor emits green light when excited by vacuum ultra violet light of wavelength in the range of 100 nm to 200 nm.

Further details of this invention are described in the following examples, which are only illustrative of the present invention and should not be construed as being limiting of its scope in any manner whatsoever.

EXAMPLE I

The preparation of Mn and Li activated lanthanide aluminate phosphor by a solid-state reaction is described in this example.

First, 28 grams of gamma (80-95%)—alpha (5-20%) aluminum oxide (0.01 to 0.02 micron powder), 18 grams of lanthanum oxalate, 0.63 grams of manganese fluoride (II), 0.64 gram of lithium fluoride are mixed in a mortar and pestle and transferred to high grade alumina crucible. The crucible is covered with lid and fired at 450° C. Fired mass is remixed in a mortar and pestle and transferred to high grade alumina crucible and calcined at 1200 to 1500° C. for 2 to 4 hours in a box furnace. Samples are re-fired in a forming gas (4.5% $H_2$+95.5% $N_2$) at 1100 to 1300° C. for 2 to 4 hours in a tube furnace.

The sample is left in the furnace in presence of forming gas until it cools down to room temperature. After cooling, these fine phosphor powders are subjected to ultrasonic agitation in water. Ultrasonic treatment helps to break the clusters into individual particles. After washing with water, these powders are dried at 120° C. for 6 hours.

Depending on the required amounts, this can be scaled up. The emission, color coordinates and persistence characteristics of the above phosphor recorded at room temperature while exciting with excitation sources (Xe lamp) are given in Table I.

EXAMPLE II

The preparation procedure is the same as in example I except 18 grams of lanthanum oxalate is replaced by 15 grams of lanthanum oxalate and 4.2 grams of gadolinium oxalate.

EXAMPLE III

The preparation procedure is the same as in example I except 18 grams of lanthanum oxalate is replaced by 15 grams of lanthanum oxalate, 3.2 grams of gadolinium oxalate and 1 gram of terbium oxalate.

EXAMPLE IV

The preparation procedure is the same as in example I except 18 grams of lanthanum oxalate is replaced by 15 grams of lanthanum oxalate, 2 grams of gadolinium oxalate, 1 gram of yttrium oxalate and 1 gram of terbium oxalate.

EXAMPLE V

The preparation procedure is the same as in example I except 0.63 grams of manganese fluoride (II) is replaced by 0.78 grams of manganese carbonate.

EXAMPLE VI

The preparation procedure is the same as in example I except 0.63 grams of manganese fluoride is replaced by 1.2 grams of manganese nitrate.

EXAMPLE VII

The preparation procedure is the same as in example I except 0.64 gram of lithium fluoride is replaced by 1.0 grams of sodium fluoride.

EXAMPLE VIII

The preparation procedure is the same as in example I except 0.64 gram of lithium fluoride is replaced by 1.28 grams of potassium fluoride.

EXAMPLE IX

The preparation of Mn and Li activated lanthanide aluminate phosphor in an acid catalyzer by a sol-gel process is described in this example. 28 grams of aluminum isopropoxide (AlP) is dissolved in 4 liters of hot water (95° C.) while stirring. 6 grams of lanthanum nitrate, 1.5 grams gadolinium nitrate, 1 gram of yttrium nitrate, 0.5 grams of terbium nitrate, 0.2 grams of lithium fluoride and 0.18 grams of manganese fluoride are added to AlP solution.

When the solution reaches 110° C., 5 cc $HNO_3$ (0.5 mol) is added drop wise and refluxed for 24 hours.

A water condenser column is maintained at 20° C. throughout the reflux by use of a circulating chiller. After cooling the flask to room temperature, the solution (dilute gel) is transferred into a crystallizing dish (3 L capacity) and left in an open atmosphere. After 5 to 6 days, the solution becomes a gel. These transparent hard gels are left at 45 to 50° C. for 12 hours in a lab oven.

The dried product appears like soft glass, called xerogel. After crushing the gel in a glass mortar and pestle, a fine powder is collected into a high-grade alumina crucible and fired at 300° C. for 2 hours (rate of is heating is 2°/min.) and then subjected to high temperature heat cycles, cooling and washing as described in Example I.

EXAMPLE X

The procedure is the same as in example IX except 28 grams of aluminum isopropoxide is replaced by 34 grams of aluminum s-butoxide.

EXAMPLE XI

Synthesis of diluted gels from lanthanide nitrates, manganese salt, lithium salt and aluminum isopropoxide in an acid medium is the same as described in Example IX and X. Gel solutions obtained are subjected to freeze drying under vacuum. A cold trap is introduced between the vacuum pump and vacuum jar with gel.

Dried powder is collected after a few hours of freeze drying at the bottom of the flask. These powders are subjected to calcination, cooling, washing and measurements as described in Example I.

EXAMPLE XII

Synthesis of diluted gels from lanthanide nitrate, manganese salt, lithium salt, and aluminum isopropoxide in an acid medium is the same as described in Example IX.

These diluted gels are sprayed through a spray nozzle in a 4" diameter glass tube, with a 12" heating zone at 120 to 150° C. Fine particles can also be produced using an ultrasonic aerosol generator (nebulizer).

After spraying about a liter of dilute gel, very fine powder is scraped from the walls of the tube. The powders are subjected to calcination, cooling washing and measurements as in Example I.

EXAMPLE XIII

The preparation procedure is the same as in Example I except 28 grams of aluminum oxide is replaced by 26 grams of aluminum oxide and 3.7 grams of gallium oxide.

EXAMPLE XIV

A blend is prepared by mixing the phosphor from Example II (90% by wt.) and 10% by wt. of terbium activated yttrium gadolinium borate phosphor.

EXAMPLE XV

A blend is prepared by mixing the phosphor from Example II (75% by wt.) and 25% by wt. of terbium activated yttrium gadolinium borate phosphor.

EXAMPLE XVI

A blend is prepared by mixing the phosphor from Example II (50% by wt.), 25% by wt. P1 and 25% by wt. of terbium activated yttrium gadolinium borate phosphor.

EXAMPLE XVII

A blend is prepared by mixing the phosphor from Example II (75% by wt.) and 25% by wt. of terbium, cerium activated lanthanum phosphate phosphor.

EXAMPLE XVIII

A blend is prepared by mixing the phosphor from Example II (50% by wt.) and 50% by wt. of terbium, cerium activated lanthanum phosphate phosphor.

EXAMPLE XIX

A blend is prepared by mixing the phosphor from Example II (50% by wt.) and 50% by wt. of terbium, cerium activated magnesium aluminate phosphor.

Table I demonstrates that the phosphors formed by solid state reaction and sol-gel processes of the present invention, provide various particle size ranges, while also generally providing a higher level of brightness, low dielectric constant, longer life and shorter persistence.

TABLE I

Luminescence Characteristics and Morphology of Manganese and Lithium activated Lanthanide Aluminate Phosphor Powders

| Method | Intensity at Excitation 147 nm | 173 nm | Half Width (nm) | Persistence 10% (ms) | 0.25% (s) | Color Co-ordinates x | y | Particle Size (μm) |
|---|---|---|---|---|---|---|---|---|
| Ex-I | 100 | 95 | 23.56 | 8.0 | 26 | 0.124 | 0.769 | 0.1-10 |
| Ex-II | 88 | 85 | 23.61 | 8.0 | 5 | 0.124 | 0.769 | 0.1-10 |
| Ex-III | 89 | 85 | 24.25 | 8.0 | 5 | 0.128 | 0.778 | 0.1-10 |
| Ex-IV | 88 | 85 | 24.28 | 8.0 | 5 | 0.127 | 0.774 | 0.1-10 |
| Ex-V | 88 | 84 | 24.18 | 8.0 | 5 | 0.126 | 0.777 | 0.1-11 |
| Ex-VI | 85 | 82 | 24.12 | 7.8 | 4.8 | 0.122 | 0.776 | 0.1-11 |
| Ex-VII | 82 | 78 | 24.29 | 7.8 | 4.9 | 0.123 | 0.776 | 0.1-11 |
| Ex-VIII | 82 | 78 | 24.29 | 7.8 | 4.9 | 0.123 | 0.776 | 0.1-11 |
| Ex-IX | 69 | 65 | 24.01 | 8.0 | 5 | 0.125 | 0.774 | 0.01-3 |
| Ex-X | 68 | 65 | 24.07 | 8.0 | 5 | 0.125 | 0.774 | 0.01-3 |
| Ex-XI | 69 | 65 | 24.00 | 8.0 | 5 | 0.125 | 0.774 | 0.01-3 |
| Ex-XII | 66 | 62 | 24.00 | 8.0 | 5 | 0.125 | 0.774 | 0.01-3 |
| EX-XIII | 61 | 57 | 23.81 | 8.5 | 5 | 0.127 | 0.779 | 0.1-10 |
| EX-XIV | | multi peaks | | 8.0 | 4.6 | 0.221 | 0.685 | 0.1-10 |
| Ex-XV | | multi peaks | | 8.0 | 3.7 | 0.275 | 0.629 | 0.1-10 |
| Ex-XVI | | multi peaks | | 8.0 | 2.0 | 0.298 | 0.609 | 0.1-10 |
| Ex-XVII | | multi peaks | | 8.0 | 2.0 | 0.260 | 0.659 | 0.1-10 |
| Ex-XVIII | | multi peaks | | 8.0 | 2.0 | 0.297 | 0.593 | 0.1-10 |
| Ex-XIX | | multi peaks | | 8.0 | 2.0 | 0.293 | 0.590 | 0.1-10 |

TABLE I-continued

Luminescence Characteristics and Morphology of Manganese and Lithium activated Lanthanide Aluminate Phosphor Powders

| | Intensity at Excitation | | Half Width | Persistence | | Color Co-ordinates | | Particle Size |
|---|---|---|---|---|---|---|---|---|
| Method | 147 nm | 173 nm | (nm) | 10% (ms) | 0.25% (s) | x | y | (μm) |
| Standard[a] | 72 | 78 | 45.24 | 9.0 | 0.5 | 0.228 | 0.714 | 0.5-10 |
| Standard[b] | | multi peaks | | 8.0 | 0.5 | 0.322 | 0.633 | 0.5-10 |
| Standard[c] | | multi peaks | | 8.0 | 0.5 | 0.259 | 0.673 | 0.5-10 |

Standard[a]: P1(ZnSiO$_4$): Mn is available from Kasei Optonix Corp., Japan;
Standard[b]: (Y,Gd)BO$_3$: Tb (U.S. Pat. No. 6,004,481);
Standard[c]: 50% P1 by wt. + 50% (Y,Gd)BO$_3$: Tb by wt. (U.S. Pat. No. 6,753,645 B2)

Table II describes the luminescent data obtained from panels made is with the phosphor of present invention, standard phosphors such as Mn activated zinc silicate and Tb activated yttrium, gadolinium borate and blends made from various compositions of the phosphor of present invention and Tb activated yttrium, gadolinium borate (U.S. Pat. No. 6,004, 481).

TABLE II

Luminescence Characteristics from 42" test panels with Phosphor of Present Invention and with Standard Phosphors

| Phosphor | Xe % | Ne % | Brightness Cd/Sq. mt | Persistence 10% (ms) | Persistence 0.25% (s) | Color Co-ordinates x | Color Co-ordinates y | Degradation (%) in hours 1K | Degradation (%) in hours 16K | Degradation (%) in hours 60K |
|---|---|---|---|---|---|---|---|---|---|---|
| Ex-I | 5 | 95 | 198 | 10 | 28 | 0.194 | 0.725 | 0 | 0 | 8.1 |
| Std.[a] | 5 | 95 | 353 | 9 | 2 | 0.268 | 0.680 | 2.1 | 4.8 | 25 |
| Std.[b] | 5 | 95 | 389 | 10 | 1 | 0.342 | 0.576 | 0 | 0 | 7.1 |
| Std.[c] | 5 | 95 | 400 | 9 | 2 | 0.302 | 0.680 | 0.5 | 3.5 | 19.8 |
| Ex-II | 15 | 85 | 259 | 10 | 5 | 0.132 | 0.784 | 0 | 11.0 | — |
| Ex-XV | 15 | 85 | 398 | 9 | 3 | 0.267 | 0.645 | 0 | 16.8 | — |
| Ex-XVII | 15 | 85 | 423 | 9 | 3 | 0.270 | 0.661 | 1 | 19.5 | — |
| Std.[a] | 15 | 85 | 400 | 9 | 2 | 0.271 | 0.661 | 2.5 | 24.1 | — |
| Std.[c] | 15 | 85 | 473 | 9 | 2 | 0.297 | 0.659 | 7.5 | 22.3 | — |

Std.[a]: P1(ZnSiO$_4$): Mn is available from Kasei Optonix Corp., Japan;
Std.[c]: 50% P1 by wt. + 50% (Y,Gd)BO$_3$: Tb by wt. (U.S. Pat. No. 6,753,645 B2)

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A green emitting Mn and alkali metal activated lanthanide aluminate phosphor having the empirical formula:

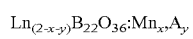

$Ln_{(2-x-y)}B_{22}O_{36}:Mn_x A_y$ wherein:
Ln is a combination of La, Y, Gd, and Tb, wherein La is: $0.57 \leq La \leq 1.782$; Y is: $0 \leq Y \leq 0.19$; Gd is: $0.198 \leq Gd \leq 0.95$; and Tb is: $0 \leq Tb \leq 0.19$;
A is selected from the group consisting of: Li, Na, K and a combination thereof;
B is selected from the group consisting of: Al and a combination of Al and Ga;
x is from about 0.01 to about 0.1; and
y is from about 0.01 to about 0.1.

2. A green emitting Mn and alkali metal activated lanthanide aluminate phosphor according to claim 1, prepared by a method comprising the steps of:

mixing a source of an alkali metal, a source of manganese, a source of lanthanide and a source of aluminum in an acid medium to form dilute aqueous solution;
removing at least a portion of water from said dilute aqueous solution to form a gel;
heating said gel at a temperature sufficient to remove excess water thereby converting said gel into a gel powder; and
thermally decomposing said gel powder at a temperature and for a length of time sufficient to produce said phosphor.

3. The phosphor of claim 2, wherein said source of alkali metal is an alkali metal salt, said source of lanthanide is a lanthanide salt, said source of manganese is manganese salt, and said source of aluminum is an organic precursor providing aluminum.

4. The phosphor of claim 3, wherein said alkali metal salt is selected from the group consisting of: alkali halides, alkali nitrate, alkali carbonate, alkali hydroxide, and mixtures thereof; said lanthanide salt is selected from the group consisting of: lanthanide oxalate, lanthanide nitrate, lanthanide oxide, and mixtures thereof; said manganese salt is selected from manganese halides, manganese nitrate, manganese carbonate, manganese hydroxide, and mixtures thereof; and said organic precursor providing aluminum is selected from the group consisting of: aluminum isopropoxide, aluminum s-butoxide, and mixtures thereof.

5. The phosphor of claim 2, wherein said gel is dried to form said gel powder prior to thermal decomposition.

6. The phosphor of claim 2, wherein said gel is vacuum dried to form said gel powder as an aerogel prior to thermal decomposition.

7. The phosphor of claim 2, wherein said gel is spray dried to form said gel powder prior to thermal decomposition.

8. The phosphor of claim 2, wherein said gel is thermally decomposed in an open atmosphere at a temperature from abut 1000° C. to about 1400° C. and then at a temperature from about 1000° C. to about 1300° C. in forming gas.

9. The phosphor of claim 1, wherein said phosphor exhibits a relative intensity (AU) at 147 nm excitation from about 90 to about 100 and relative intensity (AU) at 173 nm excitation from about 90 to about 5 with half width from about 23 to about 25 nm.

10. The phosphor of claim 1, wherein said phosphor exhibits short time persistence (10% of initial intensity) from about 7 ms to about 10 ms.

11. The phosphor of claim 1, wherein said phosphor exhibits long time persistence (0.25% of initial intensity) from about 2 seconds to about 6 seconds.

12. The phosphor of claim 1, wherein said phosphor exhibits color coordinates of x from about 0.120 to about 0.140 and y from about 0.770 to about 0.790.

13. The phosphor of claim 1, wherein said phosphor has a particle size from about 0.01 microns to about 10.0 microns.

14. A blend comprising the phosphor of claim 1 and 10% to 50% by wt. of a Tb activated rare earth borate.

15. A blend comprising the phosphor of claim 1 and 10 to 25% by weight of Mn activated zinc silicate and 10 to 25% of Tb activated rare earth borate.

16. A blend comprising the phosphor of claim 1 and 10% to 50% by wt. of Tb and Ce activated rare earth phosphate.

17. A blend comprising the phosphor of claim 1 and 10% to 50% by wt. of Tb and Ce activated magnesium aluminate.

18. A method of producing a green emitting Mn and alkali metal activated lanthanide aluminate phosphor having the empirical formula:

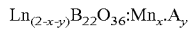

$Ln_{(2-x-y)}B_{22}O_{36}:Mn_x·A_y$ wherein:
Ln is a combination of La, Y, Gd, and Tb, wherein La is: $0.57 \leq La \leq 1.782$; Y is: $0 \leq Y \leq 0.19$; Gd is: $0.198 \leq Gd \leq 0.95$; and Tb is: $0 \leq Tb \leq 0.19$;
A is selected from the group consisting of: Li, Na, K and a combination thereof;
B is selected from the group consisting of: Al and a combination of Al and Ga;
x is from about 0.01 to about 0.1; and
y is from about 0.01 to about 0.1;
wherein said method comprises the steps of:
mixing a source of an alkali metal, a source of manganese, a source of lanthanide and a source of aluminum in an acid medium to form dilute aqueous solution;
removing at least a portion of water from said dilute aqueous solution to form a gel;
heating said gel at a temperature sufficient to remove excess water thereby converting said gel into a gel powder; and
thermally decomposing said gel powder at a temperature and for a length of time sufficient to produce said phosphor.

19. The method of claim 18, wherein said source of alkali metal is an alkali metal salt, said source of lanthanide is a lanthanide salt, said source of manganese is manganese salt, and said source of aluminum is an organic precursor providing aluminum.

20. The method of claim 19, wherein said alkali metal salt is selected from the group consisting of: alkali halides, alkali nitrate, alkali carbonate, alkali hydroxide, and mixtures thereof; said lanthanide salt is selected from the group consisting of: lanthanide oxalate, lanthanide nitrate, lanthanide oxide, and mixtures thereof; said manganese salt is selected from manganese halides, manganese nitrate, manganese carbonate, manganese hydroxide, and mixtures thereof; and said organic precursor providing aluminum is selected from the group consisting of: aluminum isopropoxide, aluminum s-butoxide, and mixtures thereof.

21. The method of claim 18, wherein said gel is dried to form said gel powder prior to thermal decomposition.

22. The method of claim 18, wherein said gel is vacuum dried to form said gel powder as an aerogel prior to thermal decomposition.

23. The method of claim 18, wherein said gel is spray dried to form said gel powder prior to thermal decomposition.

24. The method of claim 18, wherein said gel is thermally decomposed in an open atmosphere at a temperature from abut 1000° C. to about 1400° C. and then at a temperature from about 1000° C. to about 1300° C. in forming gas.

25. The method of claim 18, wherein said phosphor has a particle size from about 0.01 microns to about 10.0 microns.

26. The method of claim 18, wherein said phosphor exhibits a relative intensity (AU) at 147 nm excitation from about 90 to about 100 and relative intensity (AU) at 173 nm excitation from about 90 to about 105 with half width from about 23 to about 25 nm.

27. The method of claim 18, wherein said phosphor exhibits short time persistence (10% of initial intensity) from about 7 ms to about 10 ms.

28. The method of claim 18, wherein said phosphor exhibits color coordinates of x from about 0.120 to about 0.140 and y from about 0.770 to about 0.790.

29. The method of claim 18, wherein said source of lanthanide is lanthanide oxalate; said source of manganese halide is manganese fluoride; said source of alkali metal is alkali fluoride; and said source of aluminum is aluminum oxide.

30. The method of claim 18, wherein said powder is thermally decomposed in an open atmosphere at 1400° C. and then at a temperature equal 1200° C. in a forming gas contains 4.0 to 5.0% of $H_2$ and remaining $N_2$.

31. The method of claim 18, wherein said gel is dried to form a xerogel and said xero-gel is crushed to form a powder prior to thermal decomposition.

32. The method of claim 18, wherein said gel is vacuum dried to form an aero-gel, and said aero-gel is crushed to form a powder prior to thermal decomposition.

33. The method of claim 18, wherein said gel is spray dried to form a gel powder prior to thermal decomposition.

34. The method of claim 18, wherein said gel is sprayed ultrasonically and dried to form a gel powder prior to thermal decomposition.

35. The method of claim 18, wherein said phosphor has a particle size in the range of 0.01 to 10.0 microns.

36. The method of claim 31, wherein said powder has a particle size in the range of 0.05 to 5.0 microns.

37. The method of claim 32, wherein said powder has a particle size in the range of 0.05 to 5.0 microns.

38. The method of claim 33, wherein said powder has a particle size in the range of 0.01 to 3.0 microns.

39. The method of claim 34, wherein said powder has a particle size in the range of 0.01 to 0.02 microns.

40. A phosphor material for a plasma display panel comprising a composition represented by the formula:

$$Ln_{(2-x-y)}B_{22}O_{36}:Mn_xA_y$$

wherein:
   Ln is a combination of La, Y, Gd, and Tb, wherein La is: $0.57 \leq La \leq 1.782$; Y is: $0 \leq Y \leq 0.19$; Gd is: $0.198 \leq Gd \leq 0.95$; and Tb is: $0 \leq Tb \leq 0.19$;
   A is selected from the group consisting of: Li, Na, K and a combination thereof;
   B is selected from the group consisting of: Al and a combination of Al and Ga;
   x is from about 0.01 to about 0.1; and
   y is from about 0.01 to about 0.1;
   which phosphor emits green light when excited by vacuum ultra violet light of wavelength in the range of 100 nm to 200 nm.

41. An improved plasma display panel, having a front plate with electrodes, dielectric layer, a thin protecting layer (MgO), a back plate with electrodes, reflective layer, ribs, phosphors, and a plurality of discharge spaces filled with a gas mixture between said front plate and said back plate, wherein said gas mixture comprises 5 to 50% Xe, and 50 to 95% Ne, wherein the improvement comprises:
   a plasma display panel which includes a green emitting phosphor material comprising a composition represented by the formula:

$$Ln_{(2-x-y)}B_{22}O_{36}:Mn_xA_y$$

wherein:
   Ln is a combination of La, Y, Gd, and Tb, wherein La is: $0.57 \leq La \leq 1.782$; Y is: $0 \leq Y \leq 0.19$; Gd is: $0.198 \leq Gd \leq 0.95$; and Tb is: $0 \leq Tb \leq 0.19$;
   A is selected from the group consisting of: Li, Na, K and a combination thereof;
   B is selected from the group consisting of: Al and a combination of Al and Ga;
   x is from about 0.01 to about 0.1; and
   y is from about 0.01 to about 0.1;
   which phosphor emits green light when excited by vacuum ultra violet light of wavelength in the range of 100 nm to 200 nm.

42. A solvent free method of producing a green emitting Mn and alkali metal activated lanthanide aluminate phosphor having the empirical formula:

$$Ln_{(2-x-y)}B_{22}O_{36}:Mn_xA_y$$

wherein:
   Ln is a combination of La, Y, Gd and Tb, wherein La is: $0.57 \leq La \leq 1.782$; Y is: $0 \leq y \leq 0.19$; Gd is: $0.198 \leq Gd \leq 0.95$; and Tb is: $0 \leq Tb \leq 0.19$;
   A is selected from the group consisting of: Li, Na, K and a combination thereof;
   B is selected from the group consisting of: Al and a combination of Al and Ga;
   x is from about 0.01 to about 0.1; and
   y is from about 0.01 to about 0.1;
wherein said method comprises the steps of:
   mixing a source of an alkali metal, a source of manganese, a source of lanthanide and a source of aluminum to form a powder mixture; and thermally decomposing said powder mixture at a temperature and for a length of time sufficient to produce said phosphor.

43. The method of claim 18, wherein said gel is dried to form a xerogel, and said xero-gel is crushed to form a powder prior to thermal decomposition.

\* \* \* \* \*